(12) United States Patent
Fukushima

(10) Patent No.: US 6,246,818 B1
(45) Date of Patent: Jun. 12, 2001

(54) TUNABLE OPTICAL FILTER

(75) Inventor: Nobuhiro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/326,616

(22) Filed: Jun. 7, 1999

(30) Foreign Application Priority Data

Nov. 13, 1998 (JP) .................................................. 10-324037

(51) Int. Cl.$^7$ ...................................................... G02B 6/26
(52) U.S. Cl. .............................. 385/47; 385/140; 385/24; 385/34
(58) Field of Search .............................. 359/889; 385/27, 385/140, 47, 33, 34, 24

(56) References Cited

U.S. PATENT DOCUMENTS 5,646,399 * 7/1997 Fukushima et al. ................. 359/889
5,966,987 * 10/1999 Yoon et al. .......................... 359/889

FOREIGN PATENT DOCUMENTS 5-281480   10/1993   (JP) .
7-92530    4/1995    (JP) .

* cited by examiner

*Primary Examiner*—Hung N. Ngo
(74) *Attorney, Agent, or Firm*—Staas & Halsey LLP

(57) ABSTRACT

Disclosed herein is an optical filter usable as an optical add/drop circuit. The optical filter includes a first port, an optical filter member having a characteristic changing according to a position in a predetermined direction, a second port optically coupled to the first port by a transmitted light path concerning the optical filter member, a reflecting unit optically coupled to the first port by a reflected light path concerning the optical filter member, and a mechanism for displacing the optical filter member in the above predetermined direction. With this configuration, a variable pass band or a variable stop band can be obtained, and the characteristic is stable.

20 Claims, 9 Drawing Sheets

TUNABLE OPTICAL FILTER

BACKGROUND OF THE INVENTION

1. Field of the Invention

The present invention relates generally to a tunable optical filter, and more particularly to a tunable optical filter having a variable stop band.

2. Description of the Related Art

As a technique for constructing a flexible optical fiber network, wavelength division multiplexing (WDM) is known. In a system adopting WDM, a plurality of optical carriers having different wavelengths are used. The optical carriers are individually modulated to obtain a plurality of optical signals, which are wavelength division multiplexed by an optical multiplexer to obtain WDM signal light. The WDM signal light is launched into an optical fiber transmission line. At a receiving end, the WDM signal light received is separated into a plurality of individual optical signals by an optical demultiplexer to reproduce transmitted data according to each optical signal.

In such a system adopting WDM, an add/drop function is important. The add function is a function of joining an optical signal of a specific wavelength channel into WDM signal light, and the drop function is a function of extracting an optical signal of a specific wavelength channel from WDM signal light.

As an optical device for effecting the add/drop function, a tunable optical filter is known. In the case that the tunable optical filter is a bandpass filter, its pass band is variable, whereas in the case that the tunable optical filter is a notch filter, its stop band is variable.

Referring to FIGS. 1A and 1B, there are respectively shown the configuration and operating characteristic of a conventional tunable optical filter having a variable pass band. As shown in FIG. 1A, this tunable optical filter includes a first port 2, an optical filter member 4 having a characteristic changing according to a position in a predetermined direction (e.g., a direction parallel to the plane of the sheet of FIG. 1A), a second port 6 optically coupled to the first port 2 by a transmitted light path concerning the optical filter member 4, and a mechanism 8 for displacing the optical filter member 4 in the above predetermined direction.

The optical filter member 4 may be configured by changing the thickness of a multilayer dielectric film in the predetermined direction. When the optical filter member 4 is displaced by the mechanism 8, the pass band is shifted along a wavelength axis as shown in FIG. 1B. In FIG. 1B, the vertical axis represents transmittance (T) between the ports 2 and 6, and the horizontal axis represents wavelength ($\lambda$).

Referring to FIGS. 2A and 2B, there are respectively shown the configuration and operating characteristic of a conventional tunable optical filter having a variable stop band. This tunable optical filter includes a first port 10, an optical filter member 12 having a characteristic changing according to a position in a predetermined direction (e.g., a direction parallel to the plane of the sheet of FIG. 2A), a second port 14 optically coupled to the first port 10 by a transmitted light path concerning the optical filter member 12, a third port 16 optically coupled to the first port 10 by a reflected light path concerning the optical filter member 12, and a mechanism 18 for displacing the optical filter member 12 in the above predetermined direction.

In the case that the optical filter member 12 has a characteristic similar to that of the optical filter member 4 shown in FIG. 1A, the wavelength characteristic of transmittance between the first port 10 and the second port 14 is variable along a wavelength axis as in FIG. 1B. Further, as shown in FIG. 2B, the wavelength characteristic of reflectance between the first port 10 and the third port 16 is variable. In FIG. 2B, the vertical axis represents reflectance (R), and the horizontal axis represents wavelength ($\lambda$). The characteristic shown in FIG. 2B is reverse to the characteristic shown in FIG. 1B.

In the optical coupling by the transmitted light path as shown in FIG. 1A, the transmittance is almost stable irrespective of an angular deviation of the optical filter member 4 due to play or the like in the mechanism 8. In the case that the transmitted light path is provided by a parallel beam, for example, shifting of the parallel beam due to the angular deviation has almost no effect on a coupling efficiency between the ports 2 and 6.

However, in the case that the first port 10 and the third port 16 are optically coupled by the reflected light path as shown in FIG. 2A, an angular deviation of the optical filter member 12 has a direct effect on the reflectance, causing instability of the operation. In the case that the reflected light path is provided by a parallel beam, for example, the angular deviation has a profound effect on a coupling efficiency between the ports 10 and 16. Thus, the prior art tunable optical filter having a variable stop band has a problem that the operation becomes unstable.

SUMMARY OF THE INVENTION

It is therefore an object of the present invention to provide a tunable optical filter having a variable stop band and a stable characteristic.

In accordance with an aspect of the present invention, there is provided a tunable optical filter comprising a first port; an optical filter member having a characteristic changing according to a position in a predetermined direction; a second port optically coupled to the first port by a transmitted light path concerning the optical filter member; a reflecting unit optically coupled to the first port by a reflected light path concerning the optical filter member; and a mechanism for displacing the optical filter member in the predetermined direction.

The reflecting unit may be provided by a cat's eye or a corner cube both generally known in the field of optics. The cat's eye is composed of a lens provided on the reflected light path and a mirror having a reflecting surface at a focal point of the lens. By using such a reflecting unit, reflected light from the reflecting unit travels back the same optical path as that of incident light irrespective of an angle of incidence on the reflecting unit, so that there is no possibility that the characteristic of the optical filter member may be changed by an angular deviation of the optical filter member.

In the case that the optical filter member has such a characteristic as shown in FIG. 1B, for example, the function of a bandpass filter can be obtained between the first port and the second port. Further, since the reflecting unit is provided, the first port can also function as an input/output port of a notch filter. Accordingly, in a preferred embodiment wherein the function of only a notch filter is required, the second port may be eliminated.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 3:
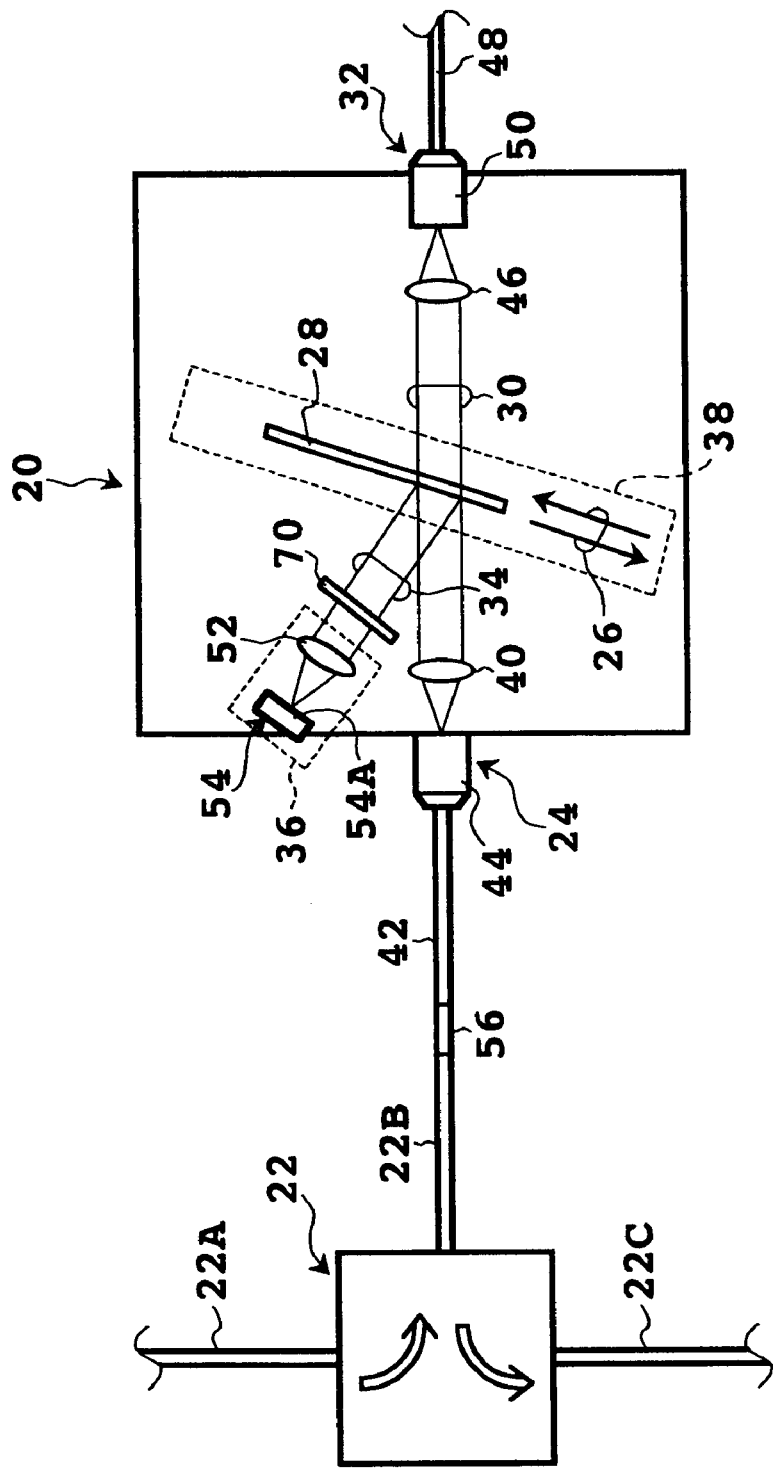
FIG. 3 is a schematic diagram showing a preferred embodiment of the tunable optical filter according to the present invention.

FIG. 3 is a schematic diagram showing a preferred embodiment of the tunable optical filter according to the present invention. This tunable optical filter includes a filter module 20 characteristic of the present invention and an optical circulator 22 optically connected to the filter module 20.

The filter module 20 includes a first port 24, an optical filter member 28 having a characteristic changing according to a position in a predetermined direction shown by arrows 26, a second port 32 optically coupled to the first port 24 by a transmitted light path 30 concerning the optical filter member 28, a reflecting unit 36 optically coupled to the first port 24 by a reflected light path 34 concerning the optical filter member 28, and a mechanism 38 for displacing the optical filter member 28 in the predetermined direction shown by the arrows 26.

The first port 24 includes a lens 40 provided on the transmitted light path 30, an optical fiber 42 having an excitation end located at the focal point of the lens 40, and a ferrule 44 for holding the optical fiber 42.

The second port 32 includes a lens 46 provided on the transmitted light path 30, an optical fiber 48 having an excitation end located at the focal point of the lens 46, and a ferrule 50 for holding the optical fiber 48.

The reflecting unit 36 includes a lens 52 provided on the reflected light path 34 and a mirror 54 having a reflecting surface 54A at the focal point of the lens 52. The combination of the lens 52 and the mirror 54 arranged in such a positional relation is referred to as a cat's eye.

The optical circulator 22 has three ports 22A, 22B, and 22C each provided by an optical fiber. The optical circulator 22 functions so as to output light supplied to the port 22A from the port 22B, and to output light supplied to the port 22B from the port 22C. While the optical circulator 22 functions also to output light supplied to the port 22C from the port 22A, this function is not used in this preferred embodiment.

The port 22B of the optical circulator 22 and the optical fiber 42 of the first port 24 are fusion-spliced by a splice portion 56, thereby optically connecting the optical circulator 22 and the filter module 20.

While the optical circulator 22 shown is of a three-port type by way of example, an optical circulator having four or more ports may be used.

A quarter-wave plate 70 is provided on the reflected light path 34 between the optical filter member 28 and the reflecting unit 36. The function of the quarter-wave plate 70 will be hereinafter described.

Figure 4:
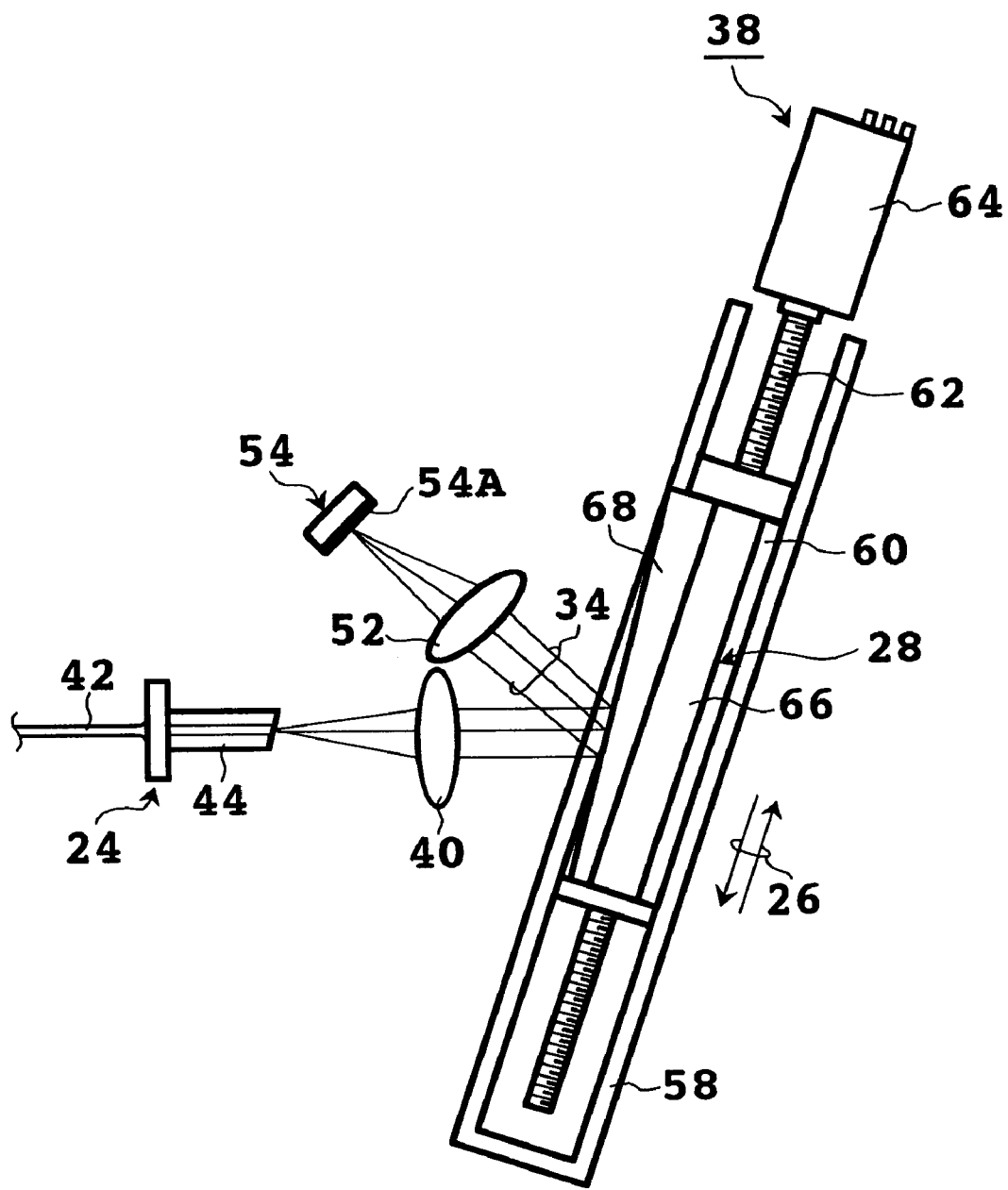
FIG. 4 is a schematic diagram showing the configuration of a mechanism 38 shown in FIG. 3.

FIG. 4 is a schematic diagram showing the configuration of the mechanism 38 shown in FIG. 3. The mechanism 38 includes a rail member 58, a slider 60 supported to the rail member 58 slidably in the direction shown by the arrows 26 for holding the optical filter member 28, a screw shaft 62 threadedly engaged with the slider 60, and a motor 64 for rotating the screw shaft 62. To accurately set a rotational amount of the screw shaft 62, a stepping motor is suitable as the motor 64. When the screw shaft 62 is rotationally driven by the motor 64, the slider 60 threadedly engaged with the screw shaft 62 is displaced in the direction shown by the arrows 26.

The optical filter member 28 is composed specifically of a transparent substrate 66 formed of glass or the like and a multilayer dielectric film 68 formed on the transparent substrate 66. The multilayer dielectric film 68 has a thickness continuously changing in the direction shown by the arrows 26, so that the characteristic of the optical filter member 28 changes according to a position in the direction shown by the arrows 26.

Figure 5:
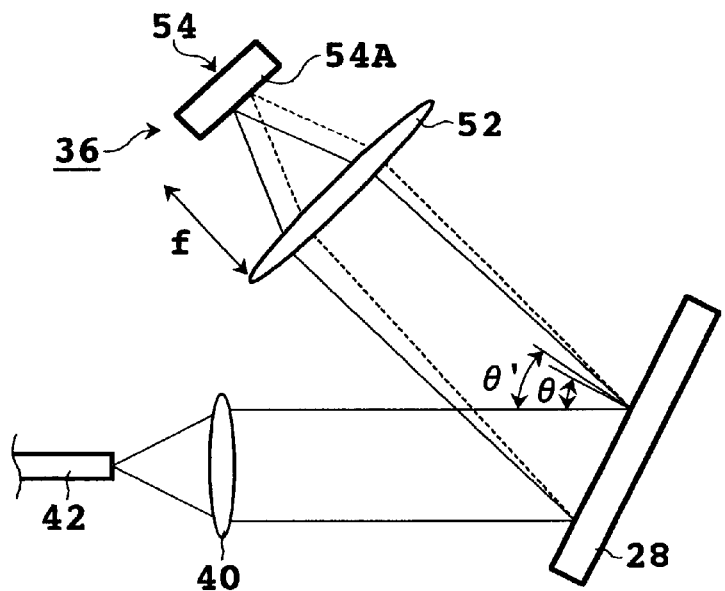
FIG. 5 is a schematic diagram for illustrating the operation of a reflecting unit 36 shown in FIG. 3.

FIG. 5 is a schematic diagram for illustrating the operation of the reflecting unit 36 shown in FIG. 3. It now assumed that light emerging from the optical fiber 42 is collimated by the lens 50 and a resultant parallel beam enters the optical filter member 28 at an incidence angle θ. A reflected beam from the optical filter member 28 is focused by the lens 52 onto the reflecting surface 54A of the mirror 54, and is reflected therefrom to travel back the same reflected light path. As a result, the reflected beam from the reflecting surface 54A of the mirror 54 enters the optical filter member 28 again at the incidence angle θ. Accordingly, the reflected beam from the optical filter member 28 is coupled to the optical fiber 42 by the lens 40 efficiently and stably.

It is now assumed that the tilt angle of the optical filter member 28 with respect to the reflected light path is slightly changed because of play or the like in the mechanism 38, causing a change of the incidence angle θ to an incidence angle θ'. In this case, a reflected beam from the optical filter member 28 is focused by the lens 52 at a position on the reflecting surface 54A of the mirror 54 different from the point of focusing in the case of the incidence angle θ. Accordingly, the reflected beam from the mirror 54 is deviated from that in the case of the incidence angle θ, however, it travels back the same reflected light path to enter the optical filter member 28 at the incidence angle θ'. Accordingly, the reflected beam from the optical filter member 28 is coupled to the optical fiber 42 by the lens 40 efficiently and stably.

In FIG. 5, f represents the focal length of the lens 52.

Thus, by using the reflecting unit 36 having a specific configuration, a coupling efficiency of light output from the optical fiber 42 and coupled again to the optical fiber 42 can be stabilized regardless of an angular deviation of the optical filter member 28 due to oscillation or the like.

In this preferred embodiment, the optical circulator 22 (see FIG. 3) is used to separate light output from the optical fiber 42 and coupled again to the optical fiber 42.

The operation of the tunable optical filter in this preferred embodiment will now be described in detail with reference to FIG. 3. The port 22A of the optical circulator 22 is an input port to which light such as WDM signal light is input. The second port 32 of the filter module 20 is an output port of a bandpass filter. The port 22C of the optical circulator 22 is an output port of a notch filter.

Figure 1A:
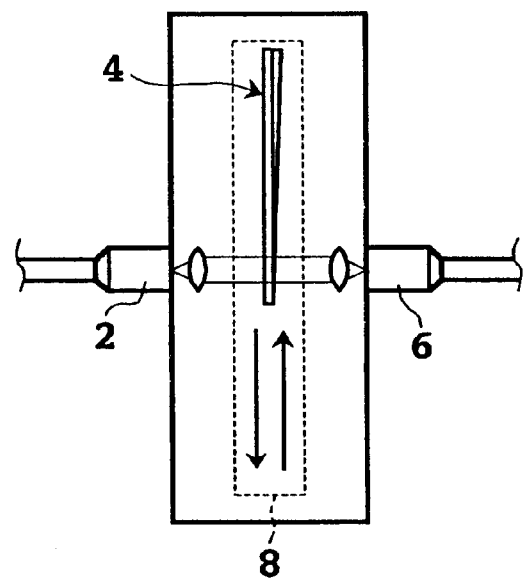
FIG. 1A is a schematic diagram showing the configuration of a conventional tunable optical filter having a variable pass band.
Figure 1B:
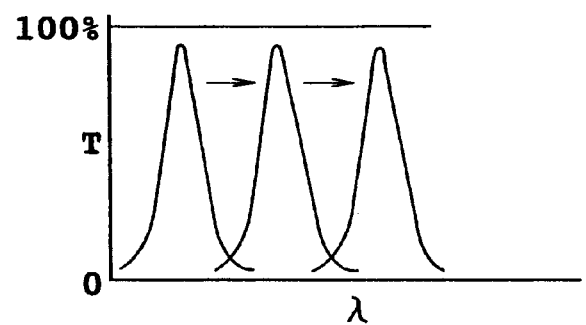
FIG. 1B is a graph showing the characteristic of the filter shown in FIG. 1A.
Figure 2A:
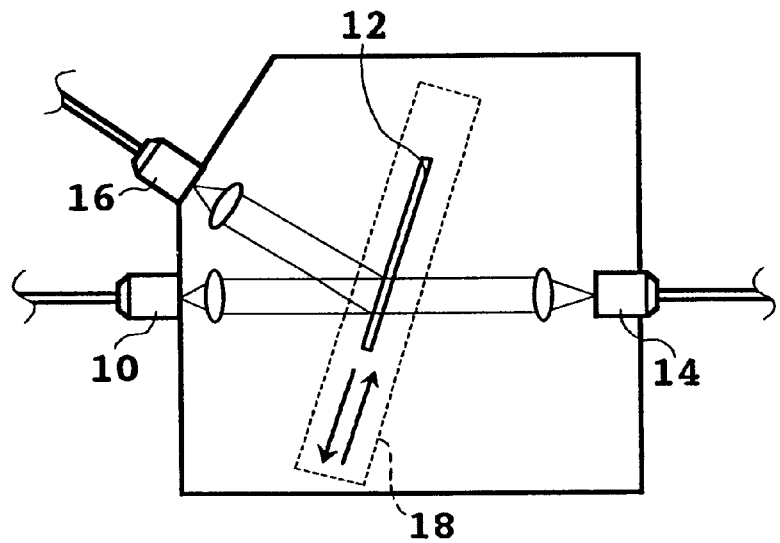
FIG. 2A is a schematic diagram showing the configuration of a conventional tunable optical filter having a variable stop band.
Figure 2B:
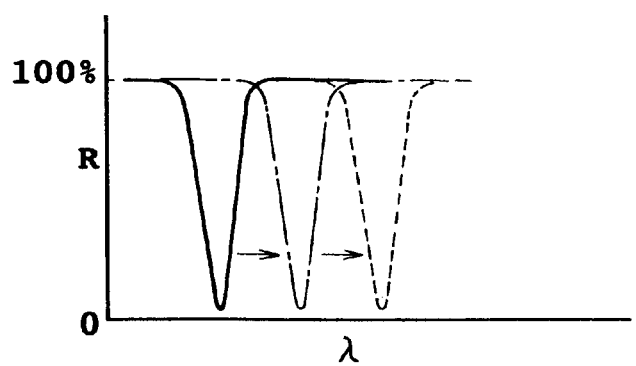
FIG. 2B is a graph showing the characteristic of the filter shown in FIG. 2A.

When light is supplied from the port 22A through the optical circulator 22 to the port 24 of the filter module 20, the light is coupled to the port 32 according to the characteristic shown in FIG. 1B, and is also coupled as reflected return light to the port 22C according to the characteristic shown in FIG. 2B.

The coupling efficiency concerning the transmitted light path 30 is almost independent of an angular deviation of the optical filter member 28 as in FIG. 1A, and the coupling efficiency concerning the reflected light path 34 is also almost independent of an angular deviation of the optical filter member 28 because of the use of the reflecting unit 36. To stably maintain the coupling efficiency concerning each of the transmitted light path 30 and the reflected light path 34 against the angular deviation of the optical filter member 28, it is preferable that the optical filter member 28 has a substantially uniform thickness. While the characteristic of the optical filter member 28 can be changed by changing the thickness of the multilayer dielectric film as mentioned above, the change in thickness of the multilayer dielectric film is less than 1 μm, so that it can be said that the optical filter member 28 has a substantially uniform thickness.

As shown in FIG. 3, the quarter-wave plate 70 is provided between the optical filter member 28 and the reflecting unit 36. Accordingly, a p-polarized light component of the reflected beam from the optical filter member 28 (from the port 24) becomes circularly polarized light after passing the quarter-wave plate 70. This circularly polarized light is reflected by the reflecting unit 36 and passed again through the quarter-wave plate 70 to become s-polarized light, which enters the optical filter member 28. On the other hand, an s-polarized light component of the reflected beam from the optical filter member 28 (from the port 24) becomes p-polarized light when returning back to the optical filter member 28. Accordingly, the reflection at the optical filter member 28 is carried out twice on the forward path and the backward path, thereby canceling the polarization dependence of reflectance of the optical filter member 28.

In the above description, a cat's eye is used as the reflecting unit 36, the reflecting unit 36 may be provided by a corner cube.

Figure 6:
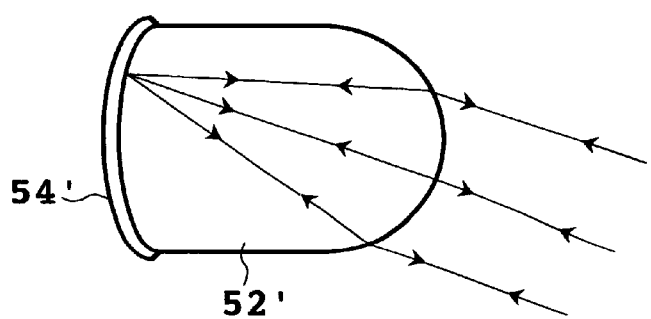
FIG. 6 is a schematic diagram showing another preferred embodiment of the reflecting unit 36 shown in FIG. 3.

FIG. 6 is a schematic diagram showing another preferred embodiment of the reflecting unit 36 shown in FIG. 3. In this preferred embodiment, a lens 52' and a mirror 54' are integrated. The mirror 54' has a curved reflecting surface. The lens 52' is formed of glass, for example, and the mirror 54' is formed by plating a rear surface of the lens 52'. A parallel beam refracted at a front surface of the lens 52' is focused on the mirror 54'. The mirror 54' has a shape such that a reflected beam from the mirror 54' travels back the same optical path as that of an incident beam. With this configuration, the reflecting unit 36 can be reduced in size, and the relative positional relation between the lens 52' and the mirror 54' can be stabilized.

Figure 7:
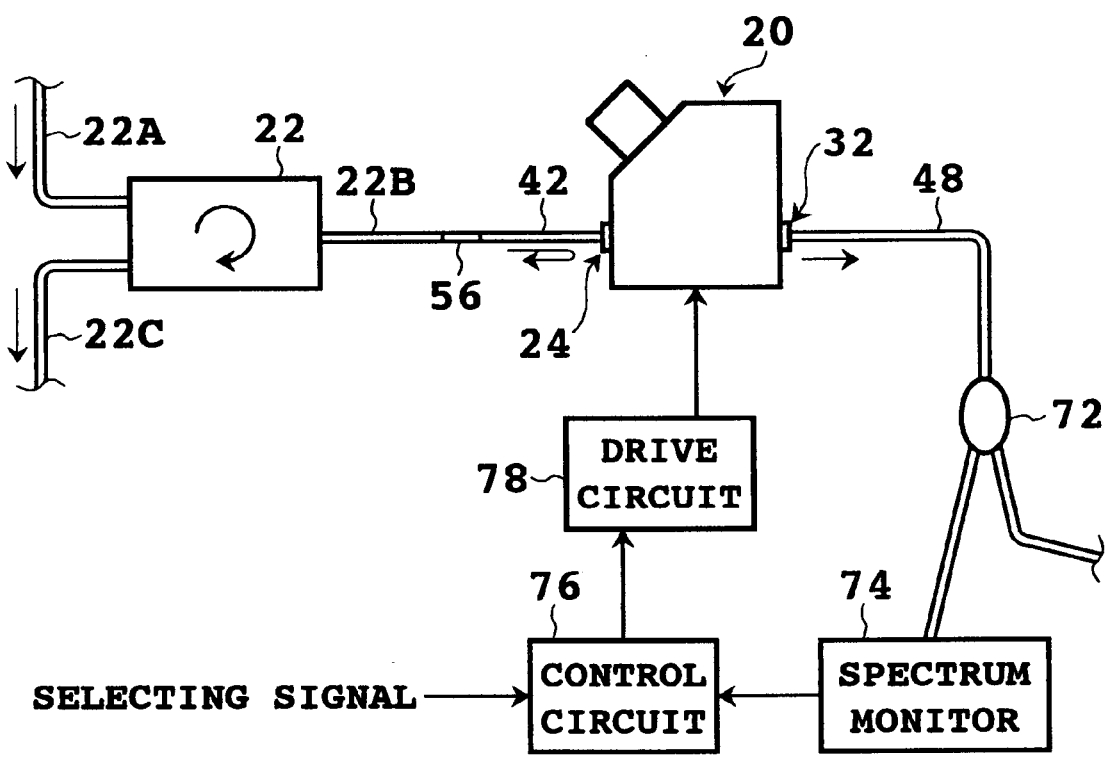
FIG. 7 is a block diagram showing a preferred embodiment of an optical add/drop circuit using the filter shown in FIG. 3.

FIG. 7 is a block diagram showing a preferred embodiment of an optical add/drop circuit configured by using the tunable optical filter shown in FIG. 3. In this preferred embodiment, the function of a drop circuit for dropping an arbitrary wavelength is realized.

The wavelength characteristic of coupling efficiency between the port 22A and the port 32 can be changed by the mechanism 38 (see FIG. 3) as shown in FIG. 1B. Accordingly, the wavelength of drop light to be output from the port 32 can be selectively determined.

The light output from the port 32 to the optical fiber 48 is partially extracted as monitor light by an optical coupler 72 (e.g., a branching ratio of 1:10), and the extracted light is supplied to a spectrum monitor 74. Information on a spectrum detected by the spectrum monitor 74 is supplied to a control circuit 76. A selecting signal for designating a selective wavelength is also supplied to the control circuit 76. A drive circuit 78 for driving the mechanism 38 for the filter module 20 is controlled by the control circuit 76, thereby determining the wavelength (or center wavelength) of light to be dropped.

The wavelength characteristic of coupling efficiency between the port 22A and the port 22C is similar to that shown in FIG. 2B. Accordingly, optical signals of all the channels except the drop light of one channel are output as through light from the port 22C.

An example of the spectrum monitor 74 is disclosed in "Power Control at ADM Node Using Compact High-Speed Optical Spectrum Monitor", IEICE Communication Society Conference, B-10-101, 1997. The spectrum monitor disclosed in this literature is composed of a first lens for collimating light emerging from an optical fiber into a parallel beam, a reflection type diffraction grating for diffracting the parallel beam, a photodetector array opposed to the diffraction grating and having a plurality of photodetectors facing a direction of diffraction by the diffraction grating, and a second lens for focusing the beam diffracted by the diffraction grating onto the photodetector array.

Figure 8:
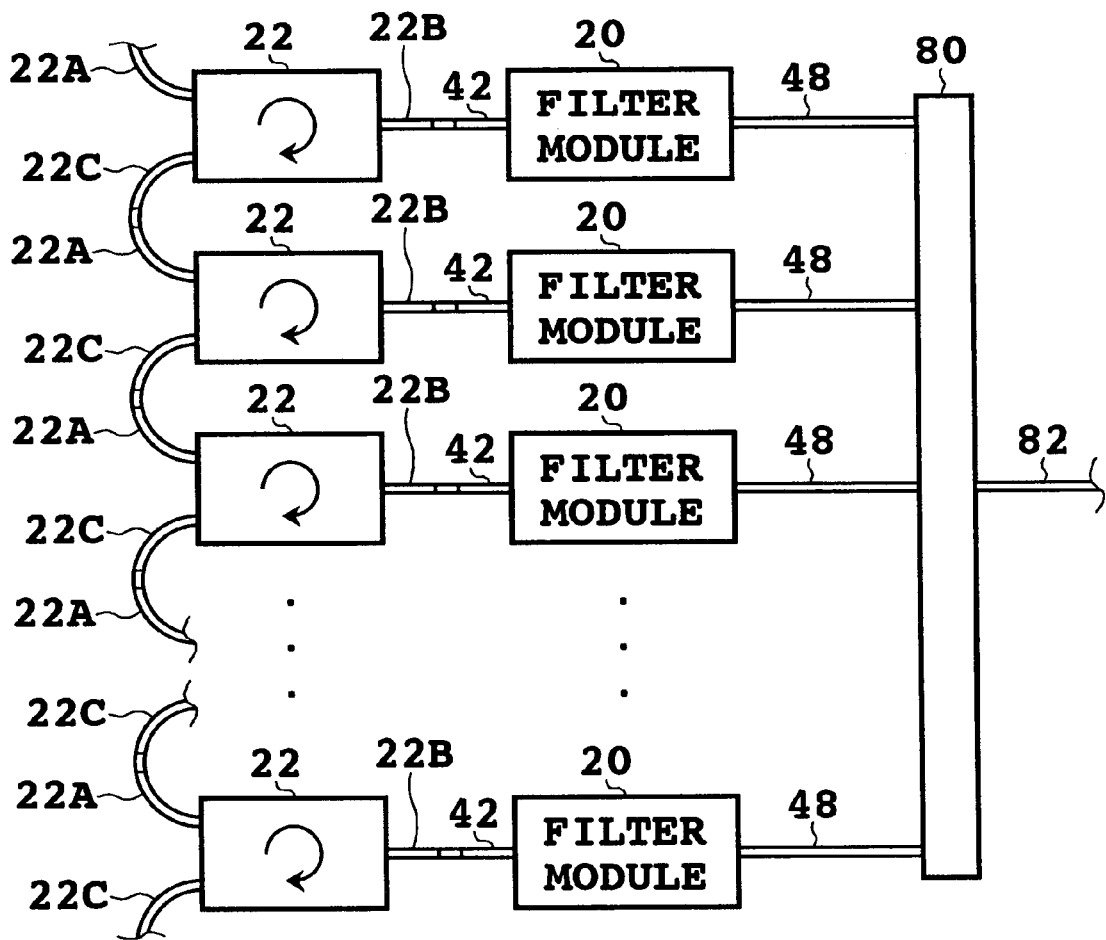
FIG. 8 is a block diagram showing another preferred embodiment of the optical add/drop circuit.

FIG. 8 is a block diagram showing another preferred embodiment of the optical add/drop circuit. This preferred embodiment employs N tunable optical filters each having the same configuration as that of the tunable optical filter shown in FIG.3. The port 22A of the first filter is an input port of this optical add/drop circuit; the port 22C of the first filter is optically connected to the port 22A of the second filter; the port 22C of the second filter is optically connected to the port 22A of the third filter; . . . ; and the port 22C of the N-th filter is a through output port of this optical add/drop circuit. The N optical fibers 48 as output ports for drop light from the ports 22B are optically connected to an optical multiplexer 80, and an output fiber 82 of the optical multiplexer 80 is an output port for drop light from this optical add/drop circuit. While each filter is provided with the spectrum monitor 74, the control circuit 76, and the drive circuit 78 shown in FIG. 7, these components are not shown in FIG. 8 for clarity of illustration.

With this configuration, the function of the optical drop circuit for a plurality of channels of optical signals can be obtained.

Figure 9:
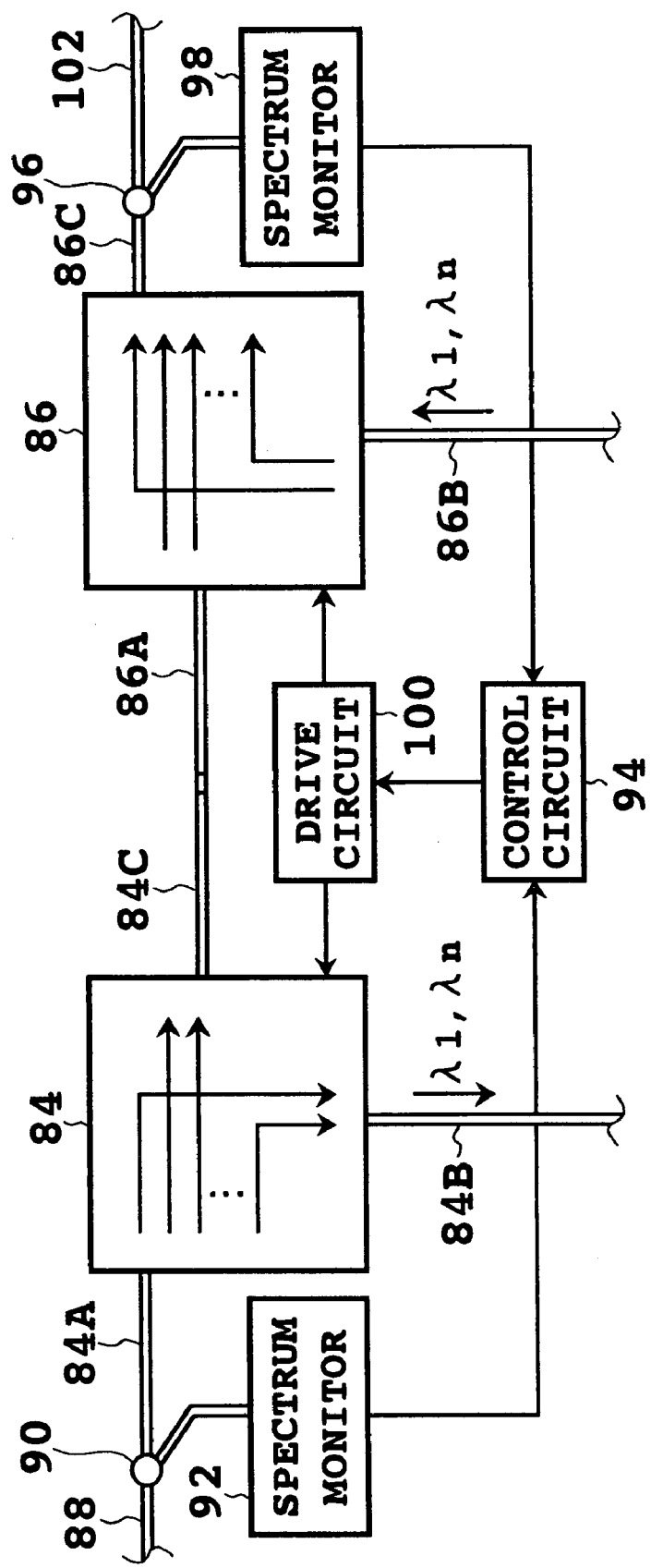
FIG. 9 is a block diagram showing still another preferred embodiment of the optical add/drop circuit.

FIG. 9 is a block diagram showing still another preferred embodiment of the optical add/drop circuit. This preferred embodiment employs two combined circuits 84 and 86 each of which may be provided by the circuit shown in FIG. 8. The circuit 84 has an input port 84A, an output port 84B for drop light, and an output port 84C for through light. The circuit 86 has an input port 86A optically connected to the port 84C, an input port 86B for add light, and an output port 86C.

WDM signal light of n channels (wavelengths $\lambda_1$ to $\lambda_n$) from an input optical fiber transmission line 88 is supplied through an optical coupler 90 into the circuit 84 from its port 84A. Monitor light extracted by the optical coupler 90 is input to a spectrum monitor 92, and an output from the spectrum monitor 92 is supplied to a control circuit 94.

An optical signal having the wavelength $\lambda_1$ and an optical signal having the wavelength $\lambda_n$ as the drop light are output from the port 84B, and optical signals having the other wavelengths are supplied from the port 84C through the port 86A to the circuit 86.

On the other hand, an optical signal having the wavelength $\lambda_1$ and an optical signal having the wavelength $\lambda_n$ as add light are supplied from the port 86B to the circuit 86, in which WDM signal light of n channels is obtained again. The WDM signal light obtained in the circuit 86 is output from the port 86C through an optical coupler 96 to an output optical fiber transmission line 102.

Monitor light extracted by the optical coupler 96 is supplied to a spectrum monitor 98, and an output from the spectrum monitor 98 is supplied to the control circuit 94. In this preferred embodiment, a common drive circuit 100 connected to the circuits 84 and 86 is controlled by the control circuit 94. Accordingly, an add channel (or add channels) and a drop channel (or drop channels) can be easily determined according to a result of comparison or the like between an input spectrum and an output spectrum.

Figure 10:
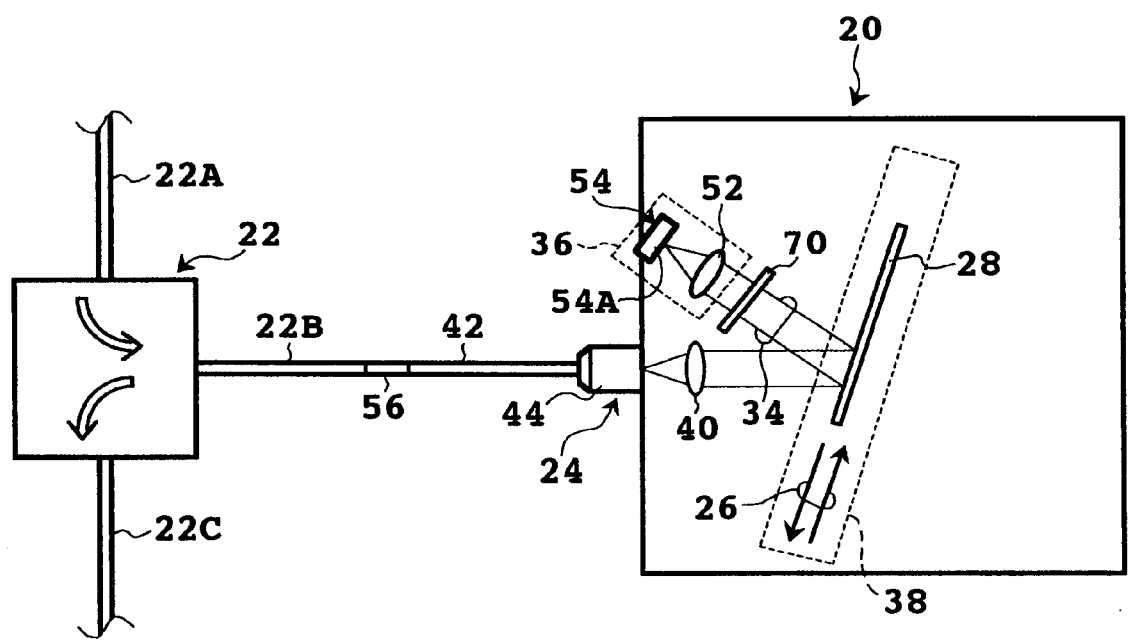
FIG. 10 is a schematic diagram showing another preferred embodiment of the tunable optical filter according to the present invention.

FIG. 10 is a schematic diagram showing another preferred embodiment of the tunable optical filter according to the present invention. In contrast to the tunable optical filter shown in FIG. 3, the tunable optical filter shown in FIG. 10 is characterized in that the second port 32 is eliminated. In this preferred embodiment, the port 22A of the optical circulator 22 is an input port to which light such as WDM signal light is supplied, and the port 22C of the optical circulator 22 is an output port of a notch filter. That is, the first port 24 of the filter module 20 of the notch filter functions as a port for inputting and outputting light.

Thus, although the second port 32 is eliminated, it is possible to provide a tunable optical filter having a variable stop band and a stable characteristic according to the present invention.

According to the present invention as described above, it is possible to provide a tunable optical filter having a variable stop band and a stable characteristic.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A tunable optical filter comprising:
   a first port;
   an optical filter member having a characteristic changing according to a position in a predetermined direction;
   a second port optically coupled to said first port by a transmitted light path concerning said optical filter member;
   a reflecting unit optically coupled to said first port by a reflected light path concerning said optical filter member; and
   a mechanism for displacing said optical filter member in said predetermined direction.

2. A tunable optical filter according to claim 1, further comprising an optical circulator having at least three ports, one of said at least three ports being optically connected to said first port.

3. A tunable optical filter according to claim 1, wherein each of said transmitted light path and said reflected light path is provided by a substantially parallel beam.

4. A tunable optical filter according to claim 3, wherein each of said first and second ports comprises a lens provided on said transmitted light path and an optical fiber having an excitation end at a focal point of said lens.

5. A tunable optical filter according to claim 3, wherein said reflecting unit comprises a lens provided on said reflected light path and a mirror having a reflecting surface at a focal point of said lens.

6. A tunable optical filter according to claim 3, wherein said reflecting unit comprises a corner cube.

7. A tunable optical filter according to claim 1, further comprising a quarter-wave plate provided between said optical filter member and said reflecting unit.

8. A tunable optical filter according to claim 1, wherein said optical filter member comprises a transparent substrate and a multilayer dielectric film formed on said transparent substrate.

9. A tunable optical filter according to claim 8, wherein said multilayer dielectric film has a thickness continuously changing in said predetermined direction.

10. A tunable optical filter according to claim 1, wherein said optical filter member has a substantially uniform thickness.

11. A tunable optical filter according to claim 1, wherein said optical filter member has properties as a bandpass filter and a notch filter respectively to said transmitted light path and said reflected light path.

12. A tunable optical filter according to claim 1, further comprising:
   a spectrum monitor optically connected to said second port; and
   means for controlling said mechanism according to an output from said spectrum monitor and a signal for designating a selective wavelength.

13. A tunable optical filter comprising:

a port for inputting and outputting light;

an optical filter member having a characteristic changing according to a position in a predetermined direction;

a reflecting unit optically coupled to said port by a reflected light path concerning said optical filter member; and a mechanism for displacing said optical filter member in said predetermined direction.

14. A tunable optical filter according to claim 13, further comprising an optical circulator having at least three ports, one of said at least three ports being optically connected to said port.

15. A tunable optical filter according to claim 13, wherein said reflected light path is provided by a substantially parallel beam.

16. A tunable optical filter according to claim 15, wherein said reflecting unit comprises a lens provided on said reflected light path and a mirror having a reflecting surface at a focal point of said lens.

17. A tunable optical filter according to claim 13, further comprising a quarter-wave plate provided between said optical filter member and said reflecting unit.

18. A tunable optical filter according to claim 13, wherein said optical filter member has a property as a notch filter to said reflected light path.

19. A tunable optical filter according to claim 1, wherein said optical filter member has a transmittance characteristic that changes according to the position in the predetermined direction.

20. A tunable optical filter according to claim 13, wherein said optical filter member has a transmittance characteristic that changes according to the position in the predetermined direction.

* * * * *